United States Patent
Tran et al.

(10) Patent No.: US 11,897,776 B2
(45) Date of Patent: Feb. 13, 2024

(54) METHOD FOR PREPARING A MONOLITHIC NANOPOROUS SILICATE SOL-GEL MATERIAL

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE—CNRS—, Paris (FR)

(72) Inventors: Clarisse Tran, Paris (FR); Thu-Hoa Tran-Thi, Montrouge (FR); Sabine Crunaire, Douai (FR); Jean-Luc Wojkiewicz, Douai (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE—CNRS—, Paris (FR)

( * ) Notice: Subject to any disclaimer, the term of this patent is extended or adjusted under 35 U.S.C. 154(b) by 314 days.

(21) Appl. No.: 17/282,536

(22) PCT Filed: Oct. 4, 2019

(86) PCT No.: PCT/FR2019/052357
§ 371 (c)(1),
(2) Date: Apr. 2, 2021

(87) PCT Pub. No.: WO2020/070456
PCT Pub. Date: Apr. 9, 2020

(65) Prior Publication Data
US 2022/0242739 A1   Aug. 4, 2022

(30) Foreign Application Priority Data
Oct. 5, 2018 (FR) .................................. 18 59266

(51) Int. Cl.
*C01B 33/155* (2006.01)
*B01J 20/10* (2006.01)
(Continued)

(52) U.S. Cl.
CPC ........... *C01B 33/155* (2013.01); *B01J 20/103* (2013.01); *B01J 20/28047* (2013.01); *C01B 33/158* (2013.01)

(58) Field of Classification Search
CPC ... C01B 33/155; C01B 33/158; C01B 33/163; B01J 20/103; B01J 20/28047
See application file for complete search history.

(56) References Cited

U.S. PATENT DOCUMENTS 5,076,980 A * 12/1991 Nogues .................. C04B 35/14
501/12
5,243,769 A * 9/1993 Wang ..................... C03B 19/12
34/470
(Continued)

OTHER PUBLICATIONS

Sglavo et al. J. Mater. Res., vol. 14, No. 5, May 1999 (Year: 1999).*
(Continued)

*Primary Examiner* — Samir Shah
*Assistant Examiner* — Jordan W Taylor
(74) *Attorney, Agent, or Firm* — Maier & Maier, PLLC

(57) ABSTRACT

A method for preparing a monolithic nanoporous silicate sol-gel material for modulating the pore size distribution for one single starting composition without the addition of a structuring agent. The method includes the following steps: a) synthesising a gel from at least one organosilylated precursor, the synthesis being carried out in an aqueous medium, optionally including an organic solvent and with-
(Continued)

out a structuring agent, and b) drying the gel obtained in step a) at a temperature between 10° C. and 70° C., preferably between 15° C. and 55° C. and more preferably between 20° C. and 40° C., in a gas flow in a drying chamber to obtain a monolithic nanoporous silicate sol-gel material and a residual relative humidity in the drying chamber of between 0.1 and 20%, preferably between 0.5 and 10% and more preferably about 5%.

17 Claims, 6 Drawing Sheets

(51) Int. Cl.
*B01J 20/28* (2006.01)
*C01B 33/158* (2006.01)

(56) References Cited

U.S. PATENT DOCUMENTS 6,096,288 A    8/2000  Roth
8,759,111 B2 * 6/2014  Crunaire ............ B01J 20/28047
                                                    436/127

OTHER PUBLICATIONS

International Search Report dated Feb. 27, 2020 in corresponding International Application No. PCT/FR2019/052357; 7 pages.
Rajeshkumar S et al. "Role of Drying Techniques On the Development of Porosity in Silica Gels" Journal of Porous Materials, Springer, Dordrecht, NL, vol. 5, No. 1, Jan. 1, 1998 (Jan. 1, 1998), pp. 59-63.
Collinson MM et al. "The effects of drying time and relative humidity on the stability of sol-gel derived silicate films in solution" Journal of Electroanalytical Chemistry, Elsevier, Amsterdam, NL, vol. 519, No. 1-2, Feb. 8, 2002 (Feb. 8, 2002), pp. 65-71.
Poulhet, G. et al., (2015), Recent developments of passive samplers for measuring material emission rates: toward simple tools to help improving indoor air quality, Building and Environment, 93, 106-114.
Yamashita et al., (2010), A simple method for screening emission sources of carbonyl compounds in indoor air, Journal of hazardous materials, 178(1-3), 370-376.
Shinohara et al., (2009), On-site passive flux sampler measurement of emission rates of carbonyls and VOCs from multiple indoor sources, Building and Environment, 44(5), 859-863.
R. Ciriminna, A. Fidalgo, V. Pandarus, F. Beland, L. Ilharco, M. Pagliaro, The Sol-Gel route to advanced silica-based materials and recent applications, Chem. Rev., 113 (2013) 6592-6620.
P. Wang et al., Prolonged-release performance of perfume encapsulated by tailoring mesoporous silica spheres, Flavour Fragr. J., 23 (2008) 29-34.
C.T. Kresge et al., Ordered mesoporous molecular sieves synthesized by a liquid-crystal template mechanism, Nature, 359 (1992) 710-712.
D. Zhao et al., Nonionic triblock and star diblock copolymer and oligomeric surfactant syntheses of highly ordered, hydrothermally stable, mesoporous silica structures, J. Am. Chem. Soc., 120 (1998) 6024-6036.
J. Wei et al., Solvent evaporation induced aggregating assembly approach to three-dimensional ordered mesoporous silica with ultra large accessible mesopores, J. Am. Chem. Soc., 133 (2011) 20369-20377.
Z. A. Al Othman, A review: Fundamental aspects of silicate mesoporous materials, Materials 5 (2012) 2874-2902.
« Techniques de l'ingénieur », « Tensioactifs non ioniques-Propriétés : tableaux comparatifs » de Guido Bognolo, Ref J2266 V1, Sep. 10, 2004.
G. A. George, G. C. Morris, The intensity of absorption of naphthalene from 30 000 cm-1 to 53 000 cm-1, J. Mol. Spectros., 26, 67-71, (1968).

* cited by examiner

METHOD FOR PREPARING A MONOLITHIC NANOPOROUS SILICATE SOL-GEL MATERIAL

FIELD

The invention relates to a process for preparing monolithic nanoporous silicate sol-gel material, allowing the pore size distribution to be modified for a given starting composition, without the addition of structuring agent.

BACKGROUND

The topic of indoor air quality has become a major issue in environmental health policy. Indoor air pollution is characterized by a set of physical or chemical pollutants (volatile organic compounds, fine particles, oxides of nitrogen or of carbon) and/or biological pollutants (molds, acarines). Volatile Organic Compounds (VOCs) arise from human activities (home improvement, cooking, room fragrancing, hygiene and cleaning products, insecticides, etc.) but also and in particular from the emissions from furnishing and construction materials.

The time spent on average by a European in an enclosed space (home, transport, school or workplace, businesses, etc.) is between 70% and 90%. Indoor air pollution therefore effects all of the population, with vulnerable persons (children, the unwell, etc.) being the most sensitive. The effects on health vary from simple nuisance (olfactory nuisance, drowsiness, irritation of the eyes and skin) to the appearance or aggravation of diseases: respiratory allergies, asthma, cancer, fatal or debilitating intoxication, etc. Accordingly, an initial, exploratory study put the socioeconomic cost of poor indoor air quality in France at about 19 billion euros per annum (ANSES, 2014).

In order to reduce individual exposure to the contaminants in indoor air, measures were put in place in France under the framework of the three National Health & Environment Plans (2004-2019). The second of these plans (2009-2013) resulted in a first measure, relating to the prohibition on the use of certain substances in construction materials and decorative products, such as trichlorethylene, benzene and certain phthalates. A second measure dictates the establishment of labelling for the emission of pollutant substances from construction materials and consumer goods (furniture, cleaning products, etc.).

In the wake of the entry into force in France, on Jan. 1, 2012, of Decree 2011-321 of Mar. 23, 2011 concerning the labeling of construction products or wall or floor coatings, and paints and varnishes, to show the levels of volatile pollutants they emit, it is necessary to carry out evaluation of emissions from the products falling within these categories, before they are placed on the market. A number of standardized methods allow the determination of the levels of emission of various VOCs: NF EN ISO 16000-9 (2006), NF EN ISO 16000-10 (2006), NF EN ISO 16000-25 (2011). Numerous other nonstandardized methods have also been proposed. They are based on the principle of passive sampling (Poulhet, G. et al., (2015), Recent developments of passive samplers for measuring material emission rates: toward simple tools to help improving indoor air quality, *Building and Environment,* 93, 106-114; Yamashita et al., (2010), A simple method for screening emission sources of carbonyl compounds in indoor air, *Journal of hazardous materials,* 178(1-3), 370-376; Shinohara et al., (2009), On-site passive flux sampler measurement of emission rates of carbonyls and VOCs from multiple indoor sources, *Building and Environment,* 44(5), 859-863). Conversely, there are few reference materials emitting one or more VOCs of interest that would enable validation of the methods for characterizing the emission levels and comparing the different methods of measurement with one another.

The materials whose VOC emissions must be measured are diverse in type, composition and form. They may be rigid solid materials such as wood-based boards (particle boards, chipboard, etc.), plaster, plastic, decorative coatings (wallpaper, paneling, etc.). They may also be solid "aerated" materials such as insulating glass wool or foam, textiles, padding, etc. Lastly, they may also be liquid materials such as paints, perfume diffusers, household products, etc. In light of this diversity, the materials do not emit the same VOCs either by the same mechanisms or at the same rates. For example, toluene, which may be present in a liquid paint, will not be emitted at the same rate as the toluene trapped within a plastic matrix. In the first case, the rate of release will be dependent on the vapor tension of toluene and its partition coefficient in the liquid. In the second case, the relative parameter will be the rate of diffusion of the toluene trapped in the material into the gas phase.

To our knowledge, therefore, there are no standard-emissivity materials that are capable of emitting a VOC at a predetermined rate within a wide range of rates. Similarly, it has hitherto been impossible to find standard materials which are able to emit a large number of VOCs of interest all at once.

The literature contains numerous patents and studies reporting the property possessed by certain materials of controlled release of active principles or fragrances. Porous materials in particular have received much attention. The main strategies for obtaining controlled release are based on the use of multilayer materials of else on control of the pore size of the material. The majority of mesoporous matrices synthesized using structuring agents take the form of powders with micrometer-size particles, or of capsules which are used for releasing active principles in liquid media (R. Ciriminna, A. Fidalgo, V. Pandarus, F. Béland, L Ilharco, M. Pagliaro, The Sol-Gel route to advanced silica-based materials and recent applications, *Chem. Rev.,* 113 (2013) 6592-6620). The main applications are in the food, pharmaceutical, cosmetic and textile industries.

One example of the 1st strategy is provided by the work of Wang et al. (P. Wang et al., Prolonged-release performance of perfume encapsulated by tailoring mesoporous silica spheres, *Flavour Fragr. J.,* 23 (2008) 29-34). These authors dope mesoporous silica spheres 500-600 nm in diameter with hydrophilic fragrances, and coat them with a shell consisting of 5 to 10 alternating layers of electrolytes which are positively charged (poly(diallyldimethylammonium) chloride) and negatively charged (poly(sodium 4-styrenesulfonate)). At a temperature of 70° C., 58% by mass of the fragrance is released in 20 minutes, and the mass subsequently remains virtually stable for the next 30 minutes of monitoring. According to the authors, the rate of release in this case may be modified via the number of layers of electrolytes that are applied to the surface of the silica sphere. This method involves heating the material and adapting the heating temperature to the molecule that is to be released.

The second strategy is the strategy which has been the most greatly developed since the discovery in 1992 of the material MCM-41 by researchers at Mobil Oil (C. T. Kresge et al., Ordered mesoporous molecular sieves synthesized by a liquid-crystal template mechanism, *Nature,* 359 (1992) 710-712) and, subsequently, of the materials MCM-50 and MCM-48 (U.S. Pat. No. 6,096,288A). The work has focused on mesoporous silicas and on methods for controlling the size distribution of the mesopores. These methods are all based on the use of a wide variety of structuring agents (template molecules) varying in size, which are neutral or charged, and of various aqueous-organic solvents able to provide them with structure in a variety of shapes (hexagonal, lamellar or cubic).

With the series of the MCM materials, the pore diameter was able to be varied between 15 and 100 Å according to the nature of the structuring agent. With the discovery in 1998 of the Santa Barbara materials, SBA-15, it was possible to widen the pore sizes to between 46 and 300 Å with the use of amphiphilic triblock copolymers (D. Zhao et al., Nonionic triblock and star diblock copolymer and oligomeric surfactant syntheses of highly ordered, hydrothermally stable, mesoporous silica structures, *J. Am. Chem. Soc.*, 120 (1998) 6024-6036). Ultrawide pores of up to 446 Å were obtainable with other structuring agents of high molecular weight, by using the method of solvent evaporation-induced aggregating assembly (EIAA) in a water-tetrahydrofuran medium (J. Wei et al., Solvent evaporation induced aggregating assembly approach to three-dimensional ordered mesoporous silica with ultra large accessible mesopores, *J. Am. Chem. Soc.*, 133 (2011) 20369-20377). The fundamental aspects of the synthesis of these materials will be found by the reader in the following review article (Z. A. A L Othman, A review: Fundamental aspects of silicate mesoporous materials, *Materials* 5 (2012) 2874-2902). It should be noted that all of these mesoporous silicates are in powder form in the majority of cases, with a nano- to micrometric particle size, irrespective of the synthesis conditions. The pores filled with structuring agents are subsequently hollowed out either by calcining at high temperature or by successive washing with water or with organic solvents, depending on the hydrophilic or hydrophobic nature of these compounds. The mesoporous silicates may also be deposited as thin films on a solid substrate. Conversely, it is not possible to produce monolithic blocks with such pore structuring.

SUMMARY

The aim of the present invention is to simplify the method of sol-gel synthesis of monolithic nanoporous silicate materials, with the possibility of modifying the pore size without adding a structuring agent. A structuring agent, in the sense of the invention, is a molecule which possesses the capacity for spontaneous self-organization during the inorganic polymerization and hence of inducing structuring of the gel on the nanometric scale. When the surfactant is a nonionic copolymer, it is able to form a ball at low levels of solvation by the solvents of the surrounding medium, and form spheres with a diameter dependent on the length of the copolymer chains. The silyl precursors undergo polycondensation around these spheres, forming an organized porous network. When the surfactant is ionic, it undergoes organization into micelles of various shapes (spherical, cubic, hexagonal, lamellar), around which the silyl precursors undergo condensation. The porosity of the materials synthesized in this way is revealed after removal of the structuring agents, in particular by calcining or washing of the gel. The size of the nanopores may be varied according to the structuring agent or agents used. Nonlimiting examples of structuring agents commonly used include nonionic surfactants, cationic surfactants and anionic surfactants. Examples of nonionic surfactants include (poly (ethylene oxide)-poly(propylene oxide)-poly(ethylene oxide) block and poly(ethylene-co-butylene)-block-poly (ethylene oxide) block copolymers, or block terpolymers such as poly(isoprene)-block-poly(styrene)-block-poly(4-vinylpyridine). An exhaustive list of nonionic surfactants is provided by the journal *Techniques de l'ingénieur*, Tensio-actifs non ioniques-Propriétés: tableaux comparatifs, by Guido Bognolo, Ref. J2266 V1, Sep. 10, 2004. The materials arising from syntheses with these structuring agents are SBA1 to SBA16 and Pluronics F98, F108 or F127. The most widely used cationic surfactants include hexadecyltrimethylammonium bromide, cetyltrimethylammonium chloride or bromide, or else 1-hexadecyl-3-methylimidazolium chloride. The anionic surfactants are linear chains of the type $C_nH_{2n+1}$— with carboxylate, sulfate, sulfonate or phosphate functions. Dodecyl sulfate is most commonly utilized in its sodium form, also known by the name SDS.

The new method proposed enables a wide range of pore sizes to be obtained without the use of a structuring agent. The reason is that, in order to remove the structuring agents, the first method consumes either organic solvents or acidified aqueous solutions, and the second consumes thermal energy in order to reach high temperatures (>150° C.).

Nanoporous monolithic materials are synthesized via the sol-gel process from organosilyl precursors: silicon alkoxides. This synthesis process is widely known and the precursors it uses are metal alkoxides of formula $Si(OR)_xR'_{n-x}$ in which R is an alkyl group and R' is a group bearing one or more functions, with n=4 and x able to be between 0 and 2. In the presence of water, the alkoxy groups (—OR) are hydrolyzed into silanol groups (Si—OH). The latter undergo condensation to form siloxane bonds (Si—O—Si) Small particles are formed with a size generally of less than 1 µm, and these particles undergo aggregation to form masses which remain in suspension without precipitating, forming a sol. The increase in the masses and their condensation raise the viscosity of the medium, which undergoes gelling. A porous solid material is obtained by drying the gel with expulsion of the solvent from the polymeric network formed (syneresis).

The pore size may be modified by carrying out syntheses in an acidic medium to obtain micropores (diameter<20 Å) or a basic medium in order to obtain mesopores (20<diameter<500 Å), or by combining functionalized organosilyl precursors in order to obtain mixed networks of micropores and mesopores. However, the descriptions of the syntheses in the literature often leave out the importance of the drying protocol (type and dimensions of the molds, temperature, humidity, presence of drying gas such as air, nitrogen or other inert gases) and of its duration. These parameters, though, allow the pore size to be modified for a given starting formulation.

Very unexpectedly and after much research, the inventors have succeeded in finding that it is possible to prepare nanoporous monolithic sol-gel materials which have a pore size that can be regulated according to the drying protocol applied, for a single synthesis process and without the use of a structuring agent.

One subject of the invention therefore relates to a process for preparing monolithic nanoporous silicate sol-gel material, said process comprising the following steps:
  a) synthesizing a gel from at least one organosilyl precursor, the synthesis being carried out in aqueous medium optionally comprising an organic solvent and without structuring agent;
  b) drying the gel obtained in step a) in a stream of gas in a drying chamber until a monolithic nanoporous silicate sol-gel material is obtained and the residual relative humidity in the drying chamber is between 0.1% and 20%, preferably between 0.5% and 10% and more preferably about 5%.

A nanoporous material in the sense of the invention is a porous material having pore sizes of less than 100 nm. According to IUPAC, pores with a diameter of less than 20 Å are called micropores, those with a diameter of between 20 Å and 500 Å are called mesopores, and those of from 500 Å to 100 nm are called macropores. The porosity of the materials is determined by establishing $N_2$ adsorption isotherms at the temperature of liquid nitrogen.

Because of the drying in a stream of gas according to step b), it is now possible to modify the pore size distribution for a given starting formulation (sol) by varying, in particular, the relative humidity of this stream of gas and/or the temperature in the drying chamber. Hence the process, according to the invention, requires the use neither of structuring agent nor of acidic or basic catalyst in order to vary the pore size distribution of a given starting material. The stream of gas may be, for example, a stream of air, nitrogen, other inert gases, such as argon, or a mixture of one or more of these gases.

The final relative humidity in the drying chamber may be attained according to different modes: in a stream of dry gas, in a stream of wet gas, or by using a combination of a wet gas stream and a dry gas stream. The invention is not limited by the type of drying chamber used. Generally, such a chamber comprises a gas inlet and a gas outlet in order to create a sweeping of the gel with the stream of gas, and also comprises means for detecting the residual level of humidity in the chamber, such as a humidity indicator. On a laboratory scale, for example, use may be made of a glass desiccator comprising a gas inlet and outlet and a humidity indicator. The skilled person can easily transpose this principle to a larger scale.

In a first embodiment, the drying in step b) is carried out in a stream of dry gas which entrains the solvents during the drying step until the residual relative humidity attained in the drying chamber is from 0.1% to 20%, preferably between 0.5% to 10% and more preferably about 5%.

In a second embodiment, the drying in b) is carried out in a stream of wet gas. In this embodiment, drying is carried out advantageously in stages with decreasing levels of humidity. For this regime, drying takes place with a first stream of gas at a first, predefined level of relative humidity, until the level of relative humidity in the chamber reaches this first setpoint value, after which the relative humidity level of the stream of gas is lowered to a second, predefined level of relative humidity, which is applied until this second setpoint value is reached in the drying chamber. This second level of relative humidity may be the final relative humidity, or drying may be continued according to the same principle with one or more additional stages, until a residual relative humidity of close to zero is reached in the drying chamber.

As an example, the stream of wet gas (air, nitrogen, other inert gases such as argon, or a mixture of one or more of these gases) is applied at a relative humidity of 80%; when the level of relative humidity in the chamber reaches 80%, the level of relative humidity of the stream of wet air is lowered to 50%; when the level of relative humidity in the chamber reaches 50%, the level of relative humidity of the stream of wet air is lowered to 30%; and then, when the relative humidity in the chamber reaches 30%, a dry gas stream (air, nitrogen or other inert gases) is applied until the final relative humidity obtained in the drying chamber is about 5%.

The drying according to step b) of the gel obtained in step a) is advantageously carried out at a temperature of between 10° C. and 70° C., preferably between 15° C. and 55° C. and more preferably between 20° C. and 40° C.

In one embodiment, the drying in step b) is carried out at a temperature of between 15° C. and 25° C., preferably at about 23° C.

In another embodiment, the drying in step b) is carried out at a temperature of between 30° C. and 50° C., preferably at about 40° C.

In step a) of the process according to the invention, the gel is advantageously synthesized in the absence of acidic or basic catalyst.

The gel is synthesized in step a) of the process according to the invention advantageously from at least one organosilyl precursor selected from tetramethoxysilane, tetraethoxysilane, phenyltrimethoxysilane, phenyltriethoxysilane, a fluoroalkyltrimethoxysilane, a fluoroalkyltriethoxysilane, a chloroalkyltrimethoxysilane, a chloroalkyltriethoxysilane, an alkyltrimethoxysilane, an alkyltriethoxysilane, an aminopropyltriethoxysilane, an aminopropyltrimethoxysilane and mixtures thereof, preferably from tetramethoxysilane, tetraethoxysilane, phenyltrimethoxysilane, a (C3-C10 alkyl) trimethoxysilane, a (C3-C10 alkyl)triethoxysilane, an aminopropyltriethoxysilane and mixtures thereof, more preferably from tetramethoxysilane (TMOS), phenyltrimethoxysilane (PhTMOS), methyltrimethoxysilane (MeTMOS), (3-aminopropyl)triethoxysilane (APTES) and mixtures thereof.

In one embodiment, the gel in step a) is synthesized from tetramethoxysilane (TMOS). In another embodiment, the gel is synthesized from a mixture of tetramethoxysilane (TMOS) and another organosilyl precursor, selected from tetraethoxysilane, phenyltrimethoxysilane (PhTMOS), phenyltriethoxysilane, a fluoroalkyltrimethoxysilane, a fluoroalkyltriethoxysilane, a chloroalkyltrimethoxysilane, a chloroalkyltriethoxysilane, an alkyltrimethoxysilane, an alkyltriethoxysilane, an aminopropyltriethoxysilane, and mixtures thereof, preferably from phenyltrimethoxysilane (PhTMOS), a (C1-C10 alkyl)trimethoxysilane, a (C1-C10 alkyl)triethoxysilane, an aminopropyltriethoxysilane and mixtures thereof, more preferably from phenyltrimethoxysilane (PhTMOS), methyltrimethoxysilane (MeTMOS), (3-aminopropyl)triethoxysilane (APTES) and mixtures thereof.

When a mixture of tetramethoxysilane and another organosilyl precursor is used, the ratio of the molar proportions of tetramethoxysilane to another organosilyl precursor may be varied from 1 to 1000, preferably from 2 to 100 and more preferably from 4 to 33.

The organic solvent employed in the synthesis of the gel in step a) is advantageously an organic solvent, preferably a C1 to C6 aliphatic alcohol, more preferably methanol or ethanol and still more preferably methanol. The skilled person knows how to readily determine the amounts of water and of polar organic solvent depending on the organosilyl precursor or precursors employed.

As explained earlier on above, it is possible by virtue of the process according to the invention to carry out reproducible manufacture of monolithic nanoporous silicate sol-gel materials which, for a given starting composition, have a porosity—i.e., a pore size distribution—which is different depending on the drying conditions applied to the drying step b) in a wet gas stream or in stages of wet gas streams. Depending on the porosity of the final material, it is possible to dope said material with a volatile organic compound (VOC) and to control the rate at which said VOC is released.

Accordingly, by virtue of the process of the present invention, it is possible to obtain, reproducibly, nanoporous standard and/or reference emissivity materials having a defined pore size distribution enabling a given VOC to be emitted at a predetermined rate. In other words, the selection of the matrix for the VOC to be trapped/released will depend on the size of the VOC; a pore size distribution very close to that of the VOC will be selected for release at a low rate. Conversely, for a rapid release, the matrix selected will have a much larger pore size distribution than that of the VOC. It is therefore possible to modify this release rate with an appropriate selection of the material. This means that it is now possible to obtain a wide range of standard and/or reference emissivity materials that are able to emit a large number of VOCs of interest with a controlled release rate. These standard and/or reference emissivity materials then make it possible to validate the methods of characterization of the emission rates, and to compare the various measurement methods with one another.

Nonlimiting working examples of the invention are described below.

DETAILED DESCRIPTION

Figure 1:
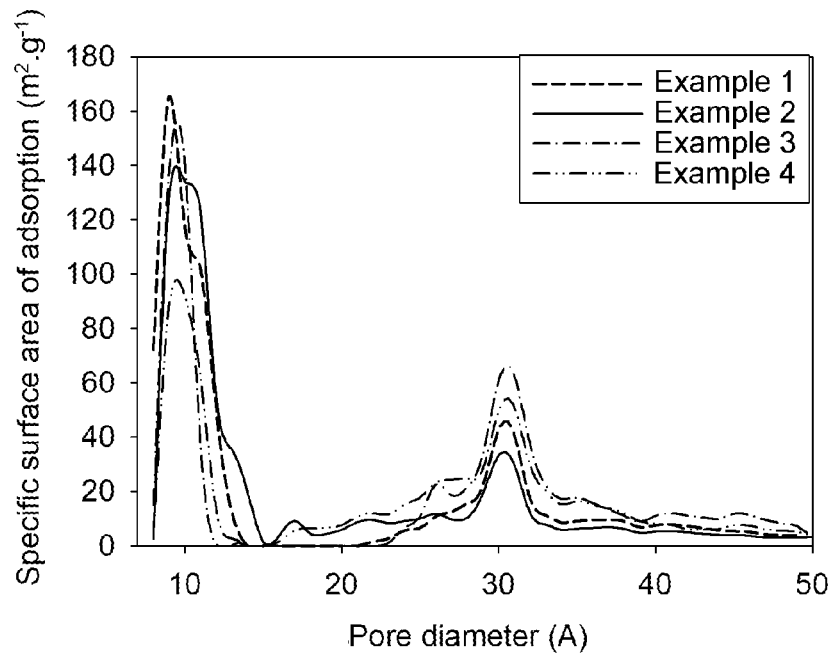
FIG. 1: Surface pore size distribution for materials based on TMOS; comparison of examples 1, 2, 3 and 4.

The examples given here correspond to syntheses performed from organosilyl precursors which are widely used for sol-gel materials, such as tetramethoxysilane (TMOS), methyltrimethoxysilane (MeTMOS), phenyltrimethoxysilane (PhTMOS) or else 3-aminopropyltrimethoxysilane (APTES) and from binary mixtures thereof (TMOS/MeTMOS, TMOS/PhTMOS, TMOS/APTES).

For each formulation, the synthesis was carried out without providing acidic or basic catalyst. The sol prepared from the reactants is poured either into individual parallelepipedal molds (polypropylene spectrophotometric cells with dimensions of 40*10*4 mm) or into molds comprising parallelepipedal wells (with dimensions of 16*10*4 mm). For drying, the mold is placed in a desiccator serving as a drying chamber, equipped with an inlet and an outlet for a sweep of drying gas stream. The interior of the drying chamber is likewise provided with a humidity indicator. As soon as the sol is converted into a gel, a precise drying protocol is applied. Depending on the drying protocols, it is possible to vary the pore size distribution of the materials originating from a given initial formulation.

When drying is carried out at 40° C., a similar device is placed in an oven heated at 40° C. The gas (dry or wet) sweeping the device is heated at 40° C.

Example 1

Reactants: Tetramethoxysilane (TMOS, CAS: 681-84-5, molar mass=152.22 g·mol$^{-1}$, d=1.023 mg·cm$^{-3}$, purity>99.9%), MeOH (CAS: 67-56-1, molar mass=32.04 g·mol$^{-1}$, d=0.792 g·cm$^{-3}$, purity 99.8%), deionized H$_2$O.

Formulation: TMOS/MeOH/H$_2$O=1/4/4 in molar proportion.

Procedure for 30 mL of sol: A round-bottom flask is charged with 11.7 mL of TMOS and 12.7 mL of methanol, which are then mixed with magnetic stirring for 2 minutes. 5.7 mL of deionized water are added to the mixture. The mixture is subsequently stirred for 5 minutes at ambient temperature in the effectively closed flask. The solution is poured into polypropylene molds, which are covered hermetically with an aluminum membrane. In example 1, the polypropylene molds are individual spectrophotometric cells with dimensions of 40*10*4 (mm).

Drying protocol: The cells are placed in a closed glass chamber (desiccator) as described above. A humidity indicator is placed in the chamber for monitoring the drying. The drying protocol begins when the sol has gelled. At this point the aluminum membrane is replaced with a porous membrane (AB-0718, Adhesive gas permeable seals, Thermo Scientific).

The chamber is swept with a stream of dry argon at 300 mL/min and at ambient temperature. When the humidity indicator indicates a relative humidity (RH) of 5% in the drying chamber, drying is halted. The total drying time is 8 days. The dry parallelepipedal monoliths are packaged individually in hermetic bags and stored (between 1 month and 1 year) before being used.

Example 2

The reactants, the mode of synthesis and the molds used here are the same as for example 1. Only the mode of drying is different.

Formulation: TMOS/MeOH/H$_2$O=1/4/4 in molar proportion.

Drying protocol: The cells are placed in a closed glass chamber as described above. A humidity indicator is placed in the chamber for monitoring the drying. The drying protocol begins when the sol has gelled. At this point the aluminum membrane is replaced with a porous membrane (AB-0718, Adhesive gas permeable seals, Thermo Scientific).

The chamber is swept with a stream of 300 mL/min of wet argon at ambient temperature and a RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 15 days. The dry parallelepipedal monoliths are packaged individually in hermetic bags and stored (between 1 month and 1 year) before being used.

Example 3

The reactants and the mode of synthesis used here are the same as those described in example 1. In example 3, the polypropylene mold is a multiwell plate, each well being a parallelepiped with dimensions of 4*10*16 mm. The drying temperature differs from example 1.

Formulation: TMOS/MeOH/H$_2$O=1/4/4 in molar proportion.

Procedure for 145 mL of sol: A round-bottom flask is charged with 56.4 mL of TMOS and 61.3 mL of methanol, which are then mixed with magnetic stirring for 2 minutes. 27.3 mL of deionized water are added to the mixture. The mixture is subsequently stirred for 5 minutes at ambient temperature in the effectively closed flask. The solution is poured into the multiwell mold, which is covered hermetically with an aluminum membrane.

Drying protocol: The multiwell mold is placed in a closed glass chamber as described above, heated at 40° C. A humidity indicator is placed in the chamber for monitoring the drying. The drying protocol begins when the sol has gelled. At this point the aluminum membrane is replaced with a porous membrane (AB-0718, Adhesive gas permeable seals, Thermo Scientific).

The chamber is swept with a stream of 300 mL/min of dry argon at a temperature of 40° C. Drying is halted when an RH of 5% is reached in the chamber. The total drying time is 7 days. The dry parallelepipedal monoliths are packaged individually in hermetic bags and stored (between 1 month and 1 year) before being used.

Example 4

The reactants, the mode of synthesis and the multiwell mold used here are the same as those described in example 3. Only the drying is different.

Formulation: TMOS/MeOH/H$_2$O=1/4/4 in molar proportion.

Procedure for 145 mL of sol: A round-bottom flask is charged with 56.4 mL of TMOS and 61.3 mL of methanol, which are then mixed with magnetic stirring for 2 minutes. 27.3 mL of deionized water are added to the mixture. The mixture is subsequently stirred for 5 minutes at ambient temperature in the effectively closed flask. The solution is poured into the multiwell mold, which is covered hermetically with an aluminum membrane.

Drying protocol: The multiwell mold is placed in a closed glass chamber as described above, heated at 40° C. A humidity indicator is placed in the chamber for monitoring the drying. The drying protocol begins when the sol has gelled. At this point the aluminum membrane is replaced with a porous membrane (AB-0718, Adhesive gas permeable seals, Thermo Scientific).

The chamber is swept with a stream of 300 mL/min of wet argon at a temperature of 40° C. and an RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber.

The total drying time is 14 days. The dry parallelepipedal monoliths are packaged individually in hermetic bags and stored (between 1 month and 1 year) before being used.

The porosity properties of examples 1, 2, 3 and 4 were determined with the establishment of N$_2$ adsorption isotherms at the temperature of liquid N$_2$. The specific surface areas of adsorption were established on the basis of a cylindrical pore model using density functional theory (DFT). Table 1 collates this data, and the pore size distributions of the materials of examples 1, 2, 3 and 4 are reported in FIG. 1.

Example 5

Reactants: Tetramethoxysilane (TMOS, CAS: 681-84-5, molar mass=152.22 g·mol$^{-1}$, d=1.023 mg·cm$^{-3}$, purity>99.9%); methyltrimethoxysilane (MeTMOS, CAS: 1185-55-3, molar mass=136.22 g·mol$^{-1}$, d=0.955 g·cm$^{-3}$, purity 98%); methanol (MeOH, CAS: 67-56-1, molar mass=32.04 g·mol$^{-1}$, d=0.791 g·cm$^{-3}$, purity 99.8%); deionized H$_2$O.

Formulation: TMOS/MeTMOS/MeOH/H$_2$O=0.90/0.10/4.02/4.06 in molar proportion.

Procedure for 30 mL of sol: A round-bottom flask is charged with 10.5 mL of TMOS, 1.1 mL of MeTMOS and 12.7 mL of methanol, which are then mixed with magnetic stirring for 2 minutes. 5.7 mL of deionized water are added to the mixture. The mixture is subsequently stirred for 5 minutes at ambient temperature in the effectively closed flask. The solution is subsequently poured into a polypropylene mold, which is covered hermetically with an aluminum membrane. In example 5, the polypropylene molds are individual spectrophotometric cells with dimensions of 40*10*4 (mm).

Drying protocol: The cells are placed in a closed glass chamber as described above. A humidity indicator is placed in the chamber for monitoring the drying.

The drying protocol begins when the sol has gelled. The aluminum membrane is replaced with a porous membrane (AB-0718, Adhesive gas permeable seals, Thermo Scientific).

The chamber is swept with a stream of dry argon at 300 mL/min and at ambient temperature. When the humidity indicator indicates a relative humidity (RH) of 5%, drying is halted. The total drying time is 8 days. The dry parallelepipedal monoliths are packaged individually in hermetic bags and stored (between 1 month and 1 year) before being used.

Example 6

The reactants and the mode of synthesis applied here are the same as those for example 5. In example 6, the mold is a multiwell plate, each well being a parallelepiped with dimensions of 4*10*16 mm. The drying temperature differs from example 5.

Formulation: TMOS/MeTMOS/MeOH/H$_2$O=0.90/0.10/4.01/4.03 in molar proportion.

Procedure for 145 mL of sol: A round-bottom flask is charged with 50.8 mL of TMOS, 5.4 mL of MeTMOS and 61.4 mL of methanol, which are then mixed with magnetic stirring for 2 minutes. 27.4 mL of deionized water are added to the mixture. The mixture is subsequently stirred for 5 minutes at ambient temperature in the effectively closed flask. The solution is poured into the multiwell mold, which is covered hermetically with an aluminum membrane.

Drying protocol: The multiwell mold is placed in a closed glass chamber as described above, and heated at 40° C. A humidity indicator is placed in the chamber for monitoring the drying. The drying protocol begins when the sol has gelled. The aluminum membrane is replaced with a porous membrane (AB-0718, Adhesive gas permeable seals, Thermo Scientific).

The chamber is swept with a stream of 300 mL/min of wet argon heated at 40° C. When the humidity indicator in the drying chamber indicates a relative humidity of 80%, the humidity of the stream is lowered to 50%. Drying is continued with a subsequent stage at 30% humidity, whereupon a stream of dry air is applied until a relative humidity of 5% is obtained in the chamber. The total drying time is 12 days. The dry parallelepipedal monoliths are packaged individually in hermetic bags and stored (between 1 month and 1 year) before being used.

Figure 2:
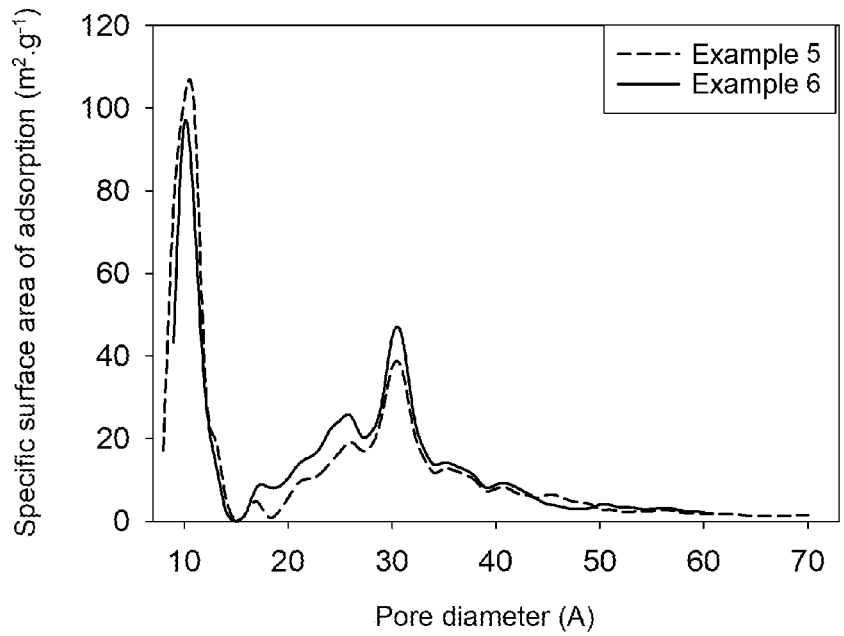
FIG. 2: Surface pore size distribution for materials based on TMOS/MeTMOS; comparison of examples 5 and 6.

The porosity properties of examples 5 and 6 were determined with the establishment of $N_2$ adsorption isotherms at the temperature of liquid $N_2$. The specific surface areas of adsorption were established on the basis of a cylindrical pore model using density functional theory (DFT). Table 1 collates this data, and the pore size distributions of the materials of examples 5 and 6 are reported in FIG. 2.

Example 7

Reactants: Tetramethoxysilane (TMOS, CAS: 681-84-5, molar mass=152.22 g·mol$^{-1}$, d=1.023 mg·cm$^{-3}$, purity>99.9%); 3-aminopropyltrimethoxysilane (APTES, CAS: 919-30-2, molar mass=221.37 g·mol$^{-1}$, d=0.946 g·cm$^{-3}$, purity 99%), methanol (MeOH, CAS: 67-56-1, molar mass=32.04 g·mol$^{-1}$, d=0.791 g·cm$^{-3}$, purity 99.8%); deionized $H_2O$.

Formulation: TMOS/APTES/MeOH/$H_2O$=0.99/0.01/5.00/4.00 in molar proportion.

Procedure for 30 mL of sol: A round-bottom flask is charged with 10.4 mL of TMOS, 0.2 mL of APTES and 14.3 mL of methanol, which are then mixed with magnetic stirring for 5 minutes. The mixture is cooled in a bath containing ethanol and liquid nitrogen to −25° C. before the water is added. 5.1 mL of deionized water are added to the mixture, which is subsequently stirred for 2 minutes in the effectively closed flask. The solution is poured into polypropylene molds, which are covered hermetically with an aluminum membrane. In example 7, the polypropylene molds are individual spectrophotometric cells with dimensions of 40*10*4 (mm).

Drying protocol: The cells are placed in a closed glass chamber as described above. A humidity indicator is placed in the chamber for monitoring the drying.

The drying protocol begins when the sol has gelled. The aluminum membrane is replaced with a porous membrane (AB-0718, Adhesive gas permeable seals, Thermo Scientific).

The chamber is swept with a stream of dry argon at 300 mL/min and at ambient temperature. When the humidity indicator indicates a relative humidity (RH) of 5% in the chamber, drying is halted. The total drying time is 7 days. The dry parallelepipedal monoliths are packaged individually in hermetic bags and stored (between 1 month and 1 year) before being used.

Example 8

The reactants, the mode of synthesis and the molds used here are the same as for example 7. Only the volume (50 mL) and the mode of drying are different.

Formulation: TMOS/APTES/MeOH/$H_2O$=0.99/0.01/5.00/4.00 in molar proportion.

Drying protocol: The cells are placed in a closed glass chamber as described above. A humidity indicator is placed in the chamber for monitoring the drying.

The drying protocol begins when the sol has gelled. The aluminum membrane is replaced with a porous membrane (AB-0718, Adhesive gas permeable seals, Thermo Scientific).

The chamber is swept with a stream of 300 mL/min of wet argon at ambient temperature. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 35 days. The dry parallelepipedal monoliths are packaged individually in hermetic bags and stored (between 1 month and 1 year) before being used.

Example 9

The reactants and the mode of synthesis used here are the same as those described in example 7. In example 9, the mold is a multiwell plate, each well being a parallelepiped with dimensions of 4*10*16 mm. The drying temperature differs from example 7.

Formulation: TMOS/APTES/MeOH/$H_2O$=0.99/0.01/5.01/4.02 in molar proportion.

Procedure for 145 mL of sol: A round-bottom flask is charged with 50.3 mL of TMOS, 0.80 mL of APTES and 69.2 mL of methanol, which are then mixed with magnetic stirring for 2 minutes. The mixture is cooled in a bath containing ethanol and liquid nitrogen to −25° C. before the water is added. 24.7 mL of deionized water are added to the mixture, which is subsequently stirred for 2 minutes in the effectively closed flask. The solution is poured into the multiwell mold, which is covered hermetically with an aluminum membrane.

Drying protocol: The multiwell mold is placed in a closed glass chamber as described above, and heated at 40° C. A humidity indicator is placed in the chamber for monitoring the drying. The drying protocol begins when the sol has gelled. The aluminum membrane is replaced with a porous membrane (AB-0718, Adhesive gas permeable seals, Thermo Scientific).

The chamber is swept with a stream of 300 mL/min of dry argon at 40° C. When the humidity indicator in the chamber indicates a relative humidity of 5%, drying is halted. The total drying time is 6 days. The dry parallelepipedal monoliths are packaged individually in hermetic bags and stored (between 1 month and 1 year) before being used.

Example 10

The reactants, the mode of synthesis and the multiwell mold used here are the same as for example 9. Only the drying is different.

Formulation: TMOS/APTES/MeOH/$H_2O$=0.99/0.01/5.01/4.02 in molar proportion.

Figure 3:
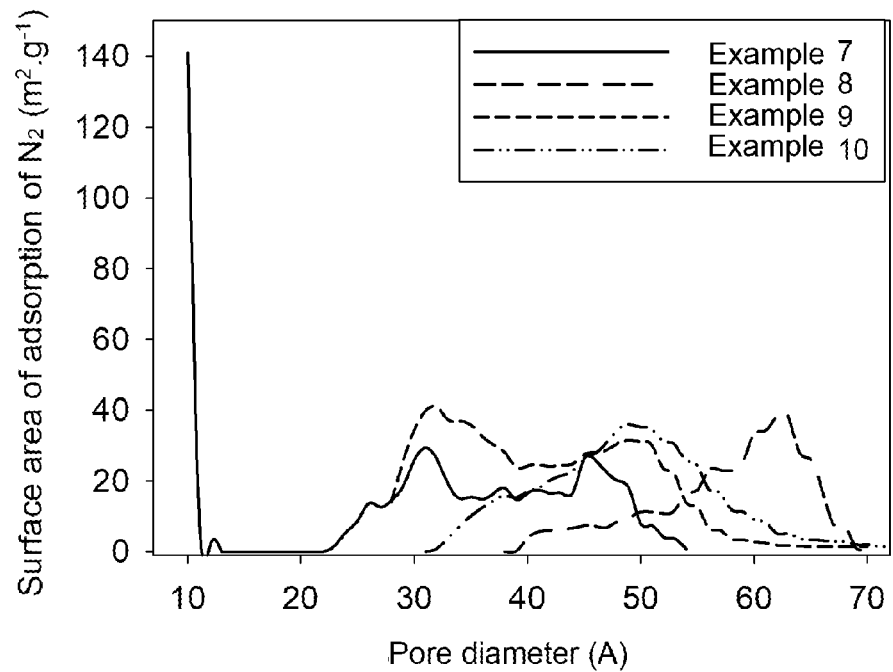
FIG. 3: Surface pore size distribution for materials based on TMOS/APTES (0.99/0.01); comparison of examples 7, 8, 9 and 10.

Drying protocol: The multiwell mold is placed in a closed glass chamber as described above, and heated at 40° C. A humidity indicator is placed in the chamber for monitoring the drying. The drying protocol begins when the sol has gelled. The aluminum membrane is replaced with a porous membrane (AB-0718, Adhesive gas permeable seals, Thermo Scientific).
The chamber is swept with a stream of 300 mL/min of wet argon heated at 40° C. and at an RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 14 days. The dry parallelepipedal monoliths are packaged individually in hermetic bags and stored (between 1 month and 1 year) before being used.
The porosity properties of examples 7, 8, 9 and 10 were determined with the establishment of $N_2$ adsorption isotherms at the temperature of liquid $N_2$. The specific surface areas of adsorption were established on the basis of a cylindrical pore model using density functional theory (DFT). Table 1 collates this data, and the pore size distributions of the materials of examples 7, 8, 9 and 10 are reported in FIG. 3.

Example 11

Reactants: Tetramethoxysilane (TMOS, CAS: 681-84-5, molar mass=152.22 g·mol$^{-1}$, d=1.023 mg·cm$^{-3}$, purity>99.9%); 3-aminopropyltrimethoxysilane (APTES, CAS: 919-30-2, molar mass=221.37 g·mol$^{-1}$, d=0.946 g·cm$^{-3}$, purity 99%), methanol (MeOH, CAS: 67-56-1, molar mass=32.04 g·mol$^{-1}$, d=0.791 g·cm$^{-3}$, purity 99.8%); deionized $H_2O$.
Formulation: TMOS/APTES/MeOH/$H_2O$=0.97/0.03/5.00/4.01 in molar proportion.
Procedure for 30 mL of sol: A round-bottom flask is charged with 10.2 mL of TMOS, 0.50 mL of APTES and 14.3 mL of methanol, which are then mixed with magnetic stirring for 5 minutes. The mixture is cooled to −30° C. (bath of ethanol and liquid nitrogen) before the water is added. 5.1 mL of deionized water are added to the mixture. The mixture is subsequently stirred for 2 minutes in the effectively closed flask. The solution is poured into polypropylene molds, which are covered hermetically with an aluminum membrane. In example 11, the polypropylene molds are individual spectrophotometric cells with dimensions of 40*10*4 (mm).
Drying protocol: The cells are placed in a closed glass chamber as described above. A humidity indicator is placed in the chamber for monitoring the drying.
The drying protocol begins when the sol has gelled. The aluminum membrane is replaced with a porous membrane (AB-0718, Adhesive gas permeable seals, Thermo Scientific).
The chamber is swept with a stream of dry argon at 300 mL/min and at ambient temperature. When the humidity indicator indicates a relative humidity (RH) of 5%, drying is halted. The total drying time is 16 days. The dry parallelepipedal monoliths are packaged individually in hermetic bags and stored (between 1 month and 1 year) before being used.

Example 12

The reactants, the mode of synthesis and the molds used here are the same as for example 11. Only the mode of drying is different.
Formulation: TMOS/APTES/MeOH/$H_2O$=0.97/0.03/5.00/4.01 in molar proportion.
Drying protocol: The cells are placed in a closed glass chamber as described above. A humidity indicator is placed in the chamber for monitoring the drying.
The drying protocol begins when the sol has gelled. The aluminum membrane is replaced with a porous membrane (AB-0718, Adhesive gas permeable seals, Thermo Scientific).
The chamber is swept with a stream of 300 mL/min of wet argon at ambient temperature and at an RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 21 days. The dry parallelepipedal monoliths are packaged individually in hermetic bags and stored (between 1 month and 1 year) before being used.

Example 13

The reactants and the mode of synthesis used here are the same as those described in example 11. In example 13, the mold is a multiwell plate, each well being a parallelepiped with dimensions of 4*10*16 mm. The mold is covered hermetically with an aluminum membrane. The drying temperature differs from example 11.
Formulation: TMOS/APTES/MeOH/$H_2O$=0.97/0.03/5.01/4.02 in molar proportion.
Procedure for 145 mL of sol: A round-bottom flask is charged with 49.1 mL of TMOS, 2.39 mL of APTES and 68.9 mL of methanol, which are then mixed with magnetic stirring for 2 minutes. The mixture is cooled in a bath containing ethanol and liquid nitrogen to −30° C. before the water is added. 24.6 mL of deionized water are added to the mixture, which is subsequently stirred for 2 minutes in the effectively closed flask. The solution is poured into the multiwell mold, which is covered hermetically with an aluminum membrane.
Drying protocol: The multiwell mold is placed in a closed glass chamber as described above, and heated at 40° C. A humidity indicator is placed in the chamber for monitoring the drying. The drying protocol begins when the sol has gelled. The aluminum membrane is replaced with a porous membrane (AB-0718, Adhesive gas permeable seals, Thermo Scientific).
The chamber is swept with a stream of 300 mL/min of dry argon at 40° C. When the humidity indicator in the chamber indicates a relative humidity of 5%, drying is halted. The total drying time is 7 days. The dry parallelepipedal monoliths are packaged individually in hermetic bags and stored (between 1 month and 1 year) before being used.

Example 14

The reactants, the mode of synthesis and the mold used here are the same as for example 13. The drying temperature is different from example 13.
Formulation: TMOS/APTES/MeOH/$H_2O$=0.97/0.03/5.01/4.02 in molar proportion.
Drying protocol: The multiwell mold is placed in a closed glass chamber as described above, and heated at 40° C. A humidity indicator is placed in the chamber for monitoring the drying. The drying protocol begins when the sol has gelled. The aluminum membrane is replaced with a porous membrane (AB-0718, Adhesive gas permeable seals, Thermo Scientific).

The chamber is swept with a stream of 300 mL/min of wet argon at 40° C. and at an RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 10 days. The dry parallelepipedal monoliths are packaged individually in hermetic bags and stored (between 1 month and 1 year) before being used.

Figure 4:
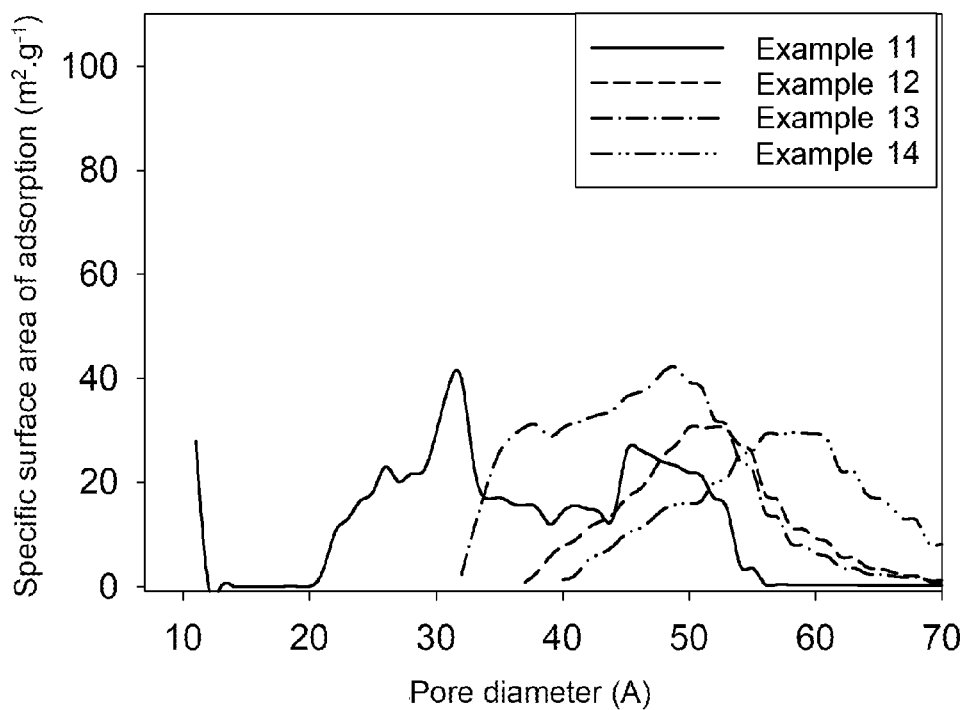
FIG. 4: Surface pore size distribution for materials based on TMOS/APTES (0.97/0.03); comparison of examples 11, 12, 13 and 14.

The porosity properties of examples 11, 12, 13 and 14 were determined with the establishment of $N_2$ adsorption isotherms at the temperature of liquid $N_2$. The specific surface areas of adsorption were established on the basis of a cylindrical pore model using density functional theory (DFT). Table 1 collates this data, and the pore size distributions of the materials of examples 11, 12, 13 and 14 are reported in FIG. 4.

Example 15

Reactants: Tetramethoxysilane (TMOS, CAS: 681-84-5, molar mass=152.22 g·mol$^{-1}$, d=1.023 mg·cm$^{-3}$, purity>99.9%); 3-aminopropyltrimethoxysilane (APTES, CAS: 919-30-2, molar mass=221.37 g·mol$^{-1}$, d=0.946 g·cm$^{-3}$, purity 99%), methanol (MeOH, CAS: 67-56-1, molar mass=32.04 g·mol$^{-1}$, d=0.791 g·cm$^{-3}$, purity 99.8%); deionized $H_2O$.

Formulation: TMOS/APTES/MeOH/$H_2O$=0.80/0.20/5.02/4.00 in molar proportion.

Procedure for 30 mL of sol: A round-bottom flask is charged with 8.1 mL of TMOS, 3.2 mL of APTES and 13.8 mL of methanol, which are then mixed with magnetic stirring for 5 minutes. The mixture is cooled to −40° C. (bath of ethanol and liquid nitrogen) before the water is added. 4.9 mL of deionized water are added to the mixture. The mixture is stirred for 1 minute in the effectively closed flask. The solution is poured into polypropylene molds, which are covered hermetically with an aluminum membrane.

In example 15, the polypropylene molds are individual spectrophotometric cells with dimensions of 40*10*4 (mm). Drying protocol: The cells are placed in a closed glass chamber as described above. A humidity indicator is placed in the chamber for monitoring the drying.

The drying protocol begins when the sol has gelled. The aluminum membrane is replaced with a porous membrane (AB-0718, Adhesive gas permeable seals, Thermo Scientific).

The chamber is swept with a stream of 300 mL/min of wet argon at ambient temperature and at an RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 34 days. The dry parallelepipedal monoliths are packaged individually in hermetic bags and stored (between 1 month and 1 year) before being used.

Example 16

The reactants and the mode of synthesis used here are the same as those described in example 15. In example 16, the mold is a multiwell plate, each well being a parallelepiped with dimensions of 4*10*16 mm. The drying temperature differs from example 15.

Formulation: TMOS/APTES/MeOH/$H_2O$=0.80/0.20/5.02/4.03 in molar proportion.

Procedure for 145 mL of sol: A round-bottom flask is charged with 39.2 mL of TMOS, 15.4 mL of APTES and 66.7 mL of methanol, which are then mixed with magnetic stirring for 2 minutes. The mixture is cooled in a bath containing ethanol and liquid nitrogen to −40° C. before the water is added. 23.8 mL of deionized water are added to the mixture, which is subsequently stirred for 2 minutes in the effectively closed flask. The solution is poured into the multiwell mold, which is covered hermetically with an aluminum membrane.

Drying protocol: The multiwell mold is placed in a closed glass chamber as described above, and heated at 40° C. A humidity indicator is placed in the chamber for monitoring the drying. The drying protocol begins when the sol has gelled. The aluminum membrane is replaced with a porous membrane (AB-0718, Adhesive gas permeable seals, Thermo Scientific).

The chamber is swept with a stream of 300 mL/min of dry argon at 40° C. When the humidity indicator in the chamber indicates a relative humidity of 5%, drying is halted. The total drying time is 7 days. The dry parallelepipedal monoliths are packaged individually in hermetic bags and stored (between 1 month and 1 year) before being used.

Example 17

The reactants, the mode of synthesis and the multiwell mold used here are the same as for example 16. Only the drying is different.

Formulation: TMOS/APTES/MeOH/$H_2O$=0.80/0.20/5.02/4.03 in molar proportion.

Drying protocol: The multiwell mold is placed in a closed glass chamber as described above, and heated at 40° C. A humidity indicator is placed in the chamber for monitoring the drying. The drying protocol begins when the sol has gelled. The aluminum membrane is replaced with a porous membrane (AB-0718, Adhesive gas permeable seals, Thermo Scientific).

The chamber is swept with a stream of 300 mL/min of wet argon at 40° C. and at an RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 9 days. The dry parallelepipedal monoliths are packaged individually in hermetic bags and stored (between 1 month and 1 year) before being used.

Figure 5:
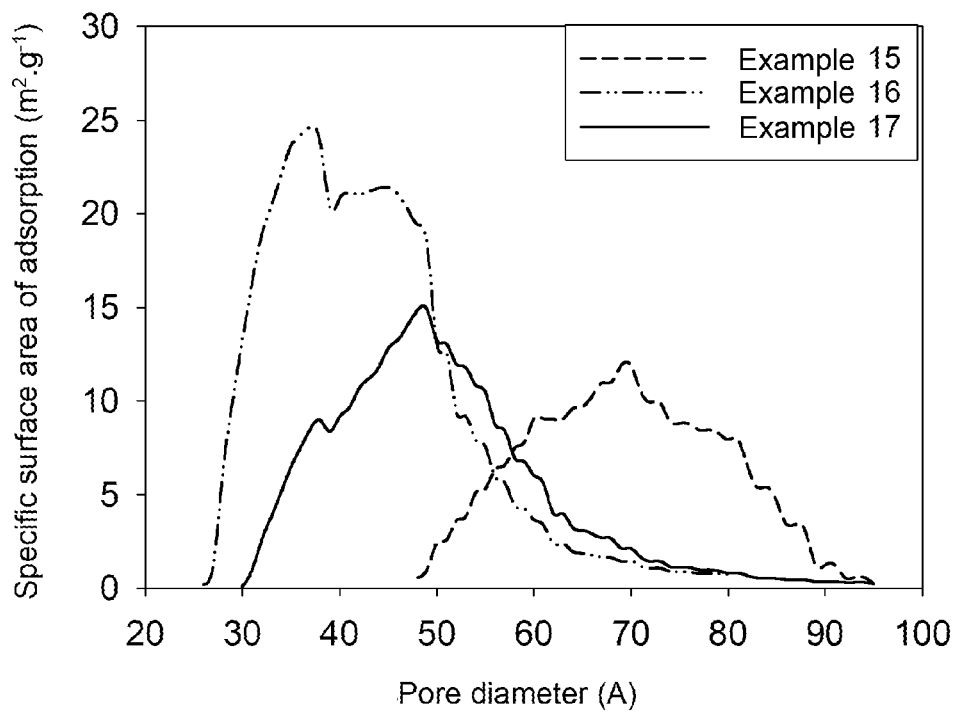
FIG. 5: Surface pore size distribution for materials based on TMOS/APTES (0.80/0.20); comparison of examples 15, 16 and 17.

The porosity properties of examples 15, 16 and 17 were determined with the establishment of $N_2$ adsorption isotherms at the temperature of liquid $N_2$. The specific surface areas of adsorption were established on the basis of a cylindrical pore model using density functional theory (DFT). Table 1 collates this data, and the pore size distributions of the materials of examples 15, 16 and 17 are reported in FIG. 5.

Example 18

Reactants: Tetramethoxysilane (TMOS, CAS: 681-84-5, molar mass=152.22 g·mol$^{-1}$, d=1.023 mg·cm$^{-3}$, purity>99.9%); phenyltrimethoxysilane (PhTMOS, CAS:

2996-92-1, molar mass=198.29 g·mol$^{-1}$, d=1.062 g·cm$^{-3}$, purity 98%); methanol (MeOH, CAS: 67-56-1, molar mass=32.04 g·mol$^{-1}$, d=0.791 g·cm$^{-3}$, purity 99.8%); deionized H$_2$O.

Formulation: TMOS/PhTMOS/MeOH/H$_2$O=0.90/0.10/6.03/5.98 in molar proportion.

Procedure for 30 mL of sol: A round-bottom flask is charged with 8.0 mL of TMOS, 1.1 mL of PhTMOS and 14.5 mL of methanol. The mixture is heated in a water bath at 60° C. The mixture is subjected to magnetic stirring for 2 minutes and then admixed with 6.4 mL of deionized water. The mixture is subsequently stirred for 3 minutes in the effectively closed flask. The solution is poured into polypropylene molds, which are covered hermetically with an aluminum membrane. In example 18, the polypropylene molds are individual spectrophotometric cells with dimensions of 40*10*4 (mm).

Drying protocol: The cells are placed in a closed glass chamber as described above. A humidity indicator is placed in the chamber for monitoring the drying.

The drying protocol begins when the sol has gelled. The aluminum membrane is replaced with a porous membrane (AB-0718, Adhesive gas permeable seals, Thermo Scientific).

The chamber is swept with a stream of 300 mL/min of wet argon at ambient temperature and at an RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 13 days. The dry parallelepipedal monoliths are packaged individually in hermetic bags and stored (between 1 month and 1 year) before being used.

Example 19

Reactants: Tetramethoxysilane (TMOS, CAS: 681-84-5, molar mass=152.22 g·mol$^{-1}$, d=1.023 mg·cm$^{-3}$, purity>99.9%); phenyltrimethoxysilane (PhTMOS, CAS: 2996-92-1, molar mass=198.29 g·mol$^{-1}$, d=1.062 g·cm$^{-3}$, purity 98%); methanol (MeOH, CAS: 67-56-1, molar mass=32.04 g·mol$^{-1}$, d=0.791 g·cm$^{-3}$, purity 99.8%); deionized H$_2$O.

Formulation: TMOS/PhTMOS/MeOH/H$_2$O=0.90/0.10/6.02/6.04 in molar proportion.

Procedure for 145 mL of sol: A round-bottom flask is charged with 38.5 mL of TMOS, 5.4 mL of PhTMOS and 69.9 mL of methanol. The mixture is heated in a water bath at 60° C. The mixture is subjected to magnetic stirring for 2 minutes and 31.2 mL of deionized water are added. The mixture is subsequently stirred for 3 minutes in the effectively closed flask. The solution is poured into the multiwell mold, which is covered hermetically with an aluminum membrane.

Drying protocol: The multiwell mold is placed in a closed glass chamber as described above, and heated at 40° C. A humidity indicator is placed in the chamber for monitoring the drying.

The drying protocol begins when the sol has gelled. The aluminum membrane is replaced with a porous membrane (AB-0718, Adhesive gas permeable seals, Thermo Scientific).

The chamber is swept with a stream of 300 mL/min of dry argon at 40° C. When the humidity indicator in the chamber indicates a relative humidity of 5%, drying is halted. The total drying time is 6 days. The dry parallelepipedal monoliths are packaged individually in hermetic bags and stored (between 1 month and 1 year) before being used.

Example 20

The reactants, the mode of synthesis and the multiwell mold used here are the same as for example 19. Only the drying is different.

Formulation: TMOS/PhTMOS/MeOH/H$_2$O=0.90/0.10/6.02/6.04 in molar proportion.

Drying protocol: The multiwell mold is placed in a closed glass chamber as described above, and heated at 40° C. A humidity indicator is placed in the chamber for monitoring the drying. The drying protocol begins when the sol has gelled. The aluminum membrane is replaced with a porous membrane (AB-0718, Adhesive gas permeable seals, Thermo Scientific).

The chamber is swept with a stream of 300 mL/min of wet argon at 40° C. and at an RH of 80%. When the humidity indicator indicates a relative humidity of 80% in the chamber, the humidity of the stream is lowered to 50%. Drying is continued with a following stage at 30% humidity, whereupon a dry stream is applied until an RH of 5% is obtained in the chamber. The total drying time is 13 days. The dry parallelepipedal monoliths are packaged individually in hermetic bags and stored (between 1 month and 1 year) before being used.

Figure 6:
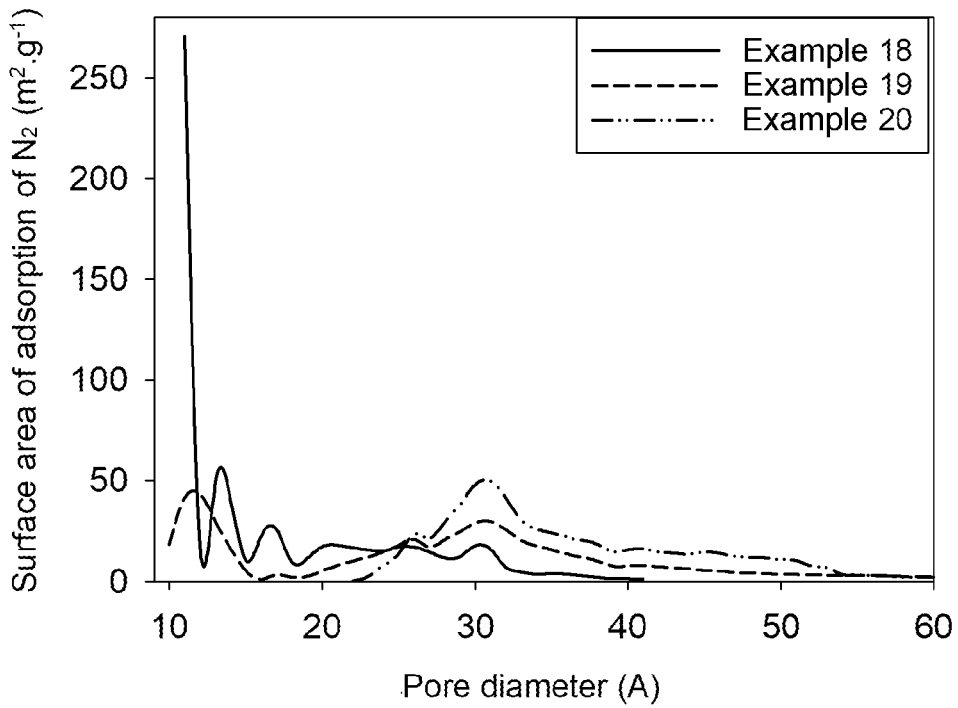
FIG. 6: Surface pore size distribution for materials based on TMOS/PhTMOS (0.90/0.10); comparison of examples 18, 19 and 20.

The porosity properties of examples 18, 19 and 20 were determined with the establishment of N$_2$ adsorption isotherms at the temperature of liquid N$_2$. The specific surface area of adsorption was established on the basis of a cylindrical pore model using density functional theory (DFT). Table 1 collates this data, and the pore size distributions of the materials of examples 18, 19 and 20 are reported in FIG. 6.

TABLE 1

|  | Formulation | Specific surface area of adsorption, $S_{DFTeq}$ (m$^2$/g) | Pore volume $V_{pore}$ (cm$^3$/g) | Percentage of micropores (%) |
| --- | --- | --- | --- | --- |
| Example 1 | TMOS/MeOH/H$_2$O | 890 ± 90 | 0.53 ± 0.06 | 58.5 |
| Example 2 | 1/4/4 | 840 ± 85 | 0.47 ± 0.05 | 63.0 |
| Example 3 |  | 890 ± 90 | 0.68 ± 0.07 | 40.6 |
| Example 4 |  | 860 ± 90 | 0.61 ± 0.06 | 37.1 |
| Example 5 | TMOS/MeTMOS/MeOH/H$_2$O 0.90/0.10/4.02/4.06 | 770 ± 80 | 0.56 ± 0.06 | 37.9 |

TABLE 1-continued

| | Formulation | Specific surface area of adsorption, $S_{DFTeq}$ (m²/g) | Pore volume $V_{pore}$ (cm³/g) | Percentage of micropores (%) |
|---|---|---|---|---|
| Example 6 | TMOS/MeTMOS/MeOH/H₂O 0.90/0.10/4.01/4.03 | 840 ± 90 | 0.62 ± 0.08 | 36.1 |
| Example 7 | TMOS/APTES/MeOH/H₂O 0.99/0.01/5.00/4.00 | 660 ± 70 | 0.54 ± 0.06 | 23.2 |
| Example 8 | | 480 ± 60 | 0.71 ± 0.08 | 0 |
| Example 9 | TMOS/APTES/MeOH/H₂O 0.99/0.01/5.01/4.02 | 860 ± 90 | 0.97 ± 0.10 | 0 |
| Example 10 | | 660 ± 70 | 0.88 ± 0.09 | 0 |
| Example 11 | TMOS/APTES/MeOH/H₂O 0.97/0.03/5.00/4.01 | 690 ± 70 | 0.64 ± 0.05 | 4.1 |
| Example 12 | | 460 ± 55 | 0.60 ± 0.06 | 0 |
| Example 13 | TMOS/APTES/MeOH/H₂O 0.97/0.03/5.01/4.02 | 930 ± 95 | 0.99 ± 0.10 | 0 |
| Example 14 | | 570 ± 65 | 0.88 ± 0.09 | 0 |
| Example 15 | TMOS/APTES/MeOH/H₂O 0.80/0.20/5.02/4.00 | 300 ± 40 | 0.53 ± 0.06 | 0 |
| Example 16 | TMOS/APTES/MeOH/H₂O 0.80/0.20/5.02/4.03 | 570 ± 65 | 0.67 ± 0.07 | 0 |
| Example 17 | | 350 ± 40 | 0.48 ± 0.05 | 0 |
| Example 18 | TMOS/PhTMOS/MeOH/H₂O 0.90/0.10/6.03/5.98 | 780 ± 80 | 0.38 ± 0.04 | 60.9 |
| Example 19 | TMOS/PhTMOS/MeOH/H₂O 0.90/0.10/6.02/6.04 | 640 ± 70 | 0.54 ± 0.06 | 26.9 |
| Example 20 | | 680 ± 70 | 0.70 ± 0.08 | 0 |

Example 21—Doping and Controlled Release of Volatile Organic Compounds (VOCs)

One of the applications is the doping and the controlled release of volatile organic compounds (VOCs) depending on the size of the compounds and the pore sizes of the material used.

Doping with Toluene or with Naphthalene

In each case, the material was doped by a gaseous route with the saturation vapor of the pollutant above the pure liquid (in the case of toluene) or the solid (in the case of naphthalene). Doping for 25 h: The materials of examples 2, 6, 7, 8, 11 and 12 were doped for 25 h with the saturation vapor of toluene, and the material of example 7 was doped for 25 h in a saturation atmosphere of vapor from solid naphthalene. Doping for 2 h: The material of example 4 was doped for 2 h with the saturation vapor of toluene, and the materials of examples 2, 3 and 7 were doped for 2 h with the saturation vapor of naphthalene.

Release in Static Mode

Figure 7:
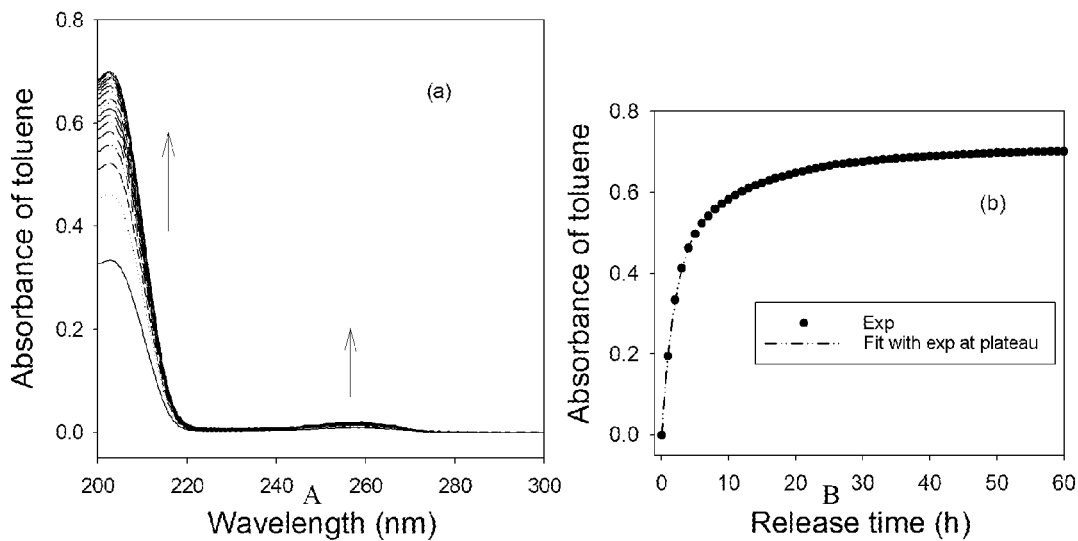
FIG. 7: Measurement of release kinetics in static mode of toluene trapped in the material of example 6. A) profile of spectral change during the release time. B) the dots (•) correspond to the variation in the absorbance of toluene at a given wavelength (203.9 nm) over time, and the dashed line (---) corresponds to the correlation with exponential growth kinetics with a plateau (Abs(toluene)=a(1-exp(-bt))) for determining the release rate, V, with V=a*b.

For the static mode release tests, the doped material of example 2 was placed in a closed glass chamber with a volume of 170 mL, containing a quartz spectrophotometer cell. The spectrophotometer is located in an air-conditioned room at 20° C. The rate of release was obtained with the measurement of the absorbance of gaseous pollutant released as a function of the release time. In this case, release is stopped when the equilibrium in concentration between the pollutant in the gas phase and in the material is reached. FIG. 7A shows the measurements of the absorbance between 200 nm and 300 nm of the toluene released for the material of example 2, for different release times. It is found that the absorbance at 203.9 nm and therefore the concentration of toluene in the atmosphere increases over time, leveling out when the equilibrium in concentration between the toluene in the gas phase and in the material is reached. FIG. 7B shows the change in the absorbance of toluene at 203.9 nm as a function of the release time (black dots) and the correlation of the measurement with kinetics of exponential growth with a plateau (Abs(toluene)=a(1-exp(-bt)) for the determination of the release rate, V (with V=a*b).

Figure 8:
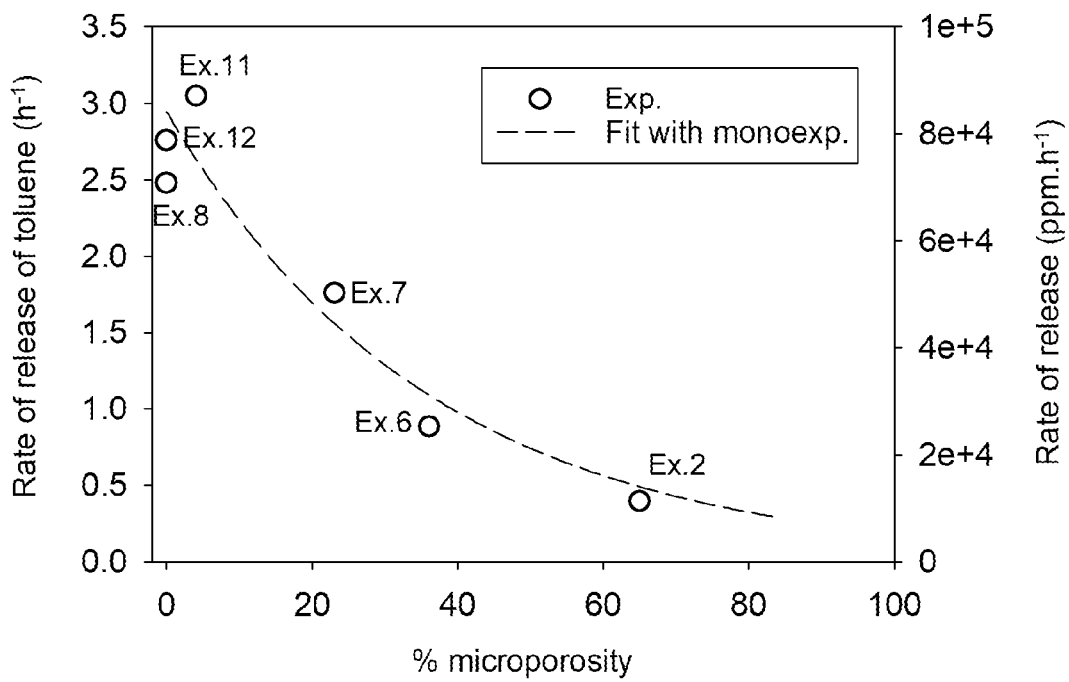
FIG. 8: Correlation between the toluene release rate and the percentage microporosity of the materials of examples 2, 6, 7, 8, 11 and 12. Each dot corresponds to the release rate determined as described in FIGS. 7A and 7B.

The release of toluene in static mode was determined for materials 2, 6, 7, 8, 11 and 12 doped for 25 h with toluene (see FIG. 8). These various materials possess different pore sizes and are characterized by their % of micropores (diameter<20 Å). The % of micropores is obtained by calculating the ratio between the specific surface area of adsorption by the pores with a size of less than or equal to 20 Å (micropores) and the total specific surface area of adsorption of the material (see table 1). The specific surface areas were obtained on the basis of the $N_2$ adsorption isotherms at the temperature of liquid $N_2$ (BET method) using cylindrical pore models and density functional theory (DFT method). FIG. 8 collates the results of these tests in graph form. The left-hand scale corresponds to an arbitrary unit·h$^{-1}$, the right-hand scale to the conversion into ppm·h$^{-1}$. The conditions of the tests were as follows: volume of the release system=170 mL, T=293 K, optical path length of the spectrophotometer cell=1 cm, molar extinction coefficient of toluene at 203.8 nm=4890 mol$^{-1}$·L·cm$^{-1}$. Each dot corresponds to the release rate determined as described above in relation to the measurements presented in FIG. 7B.

A sharp decrease in the release rate of toluene is observed when the materials possess progressively smaller pore size distributions.

Figure 9:
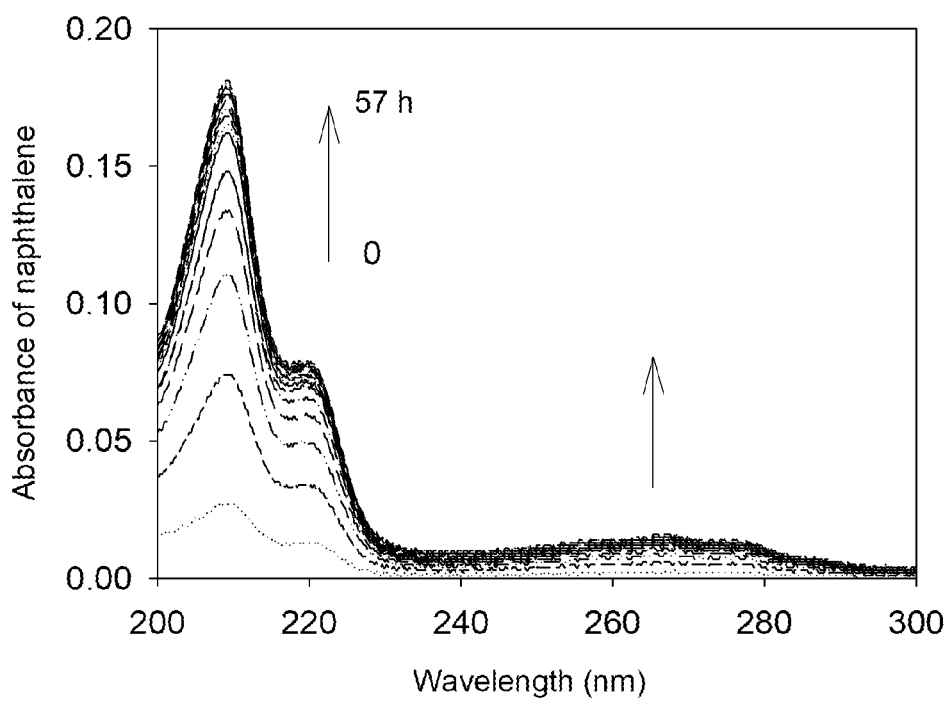
FIG. 9: Change in the absorbance of naphthalene trapped in the material of example 7 as a function of the release time, in static mode.

The material of example 7 was doped for 25 h in a saturation atmosphere of vapor from solid naphthalene. The release of naphthalene in static mode, the size of which is approximately twice that of toluene, from a matrix of example 7 is shown in FIG. 9, with the change in the absorbance of gaseous naphthalene as a function of time. The conditions of the tests were as follows: volume of the release system=170 mL, T=293 K, optical path length of the spectrophotometer cell=1 cm. The molar extinction coefficient of naphthalene is 135 800 mol·$^{-1}$·L·cm$^{-1}$ at 210 nm. This test shows that by adapting the pore size to that of the pollutant, it is also possible to modify the rate of release.

Figure 10:
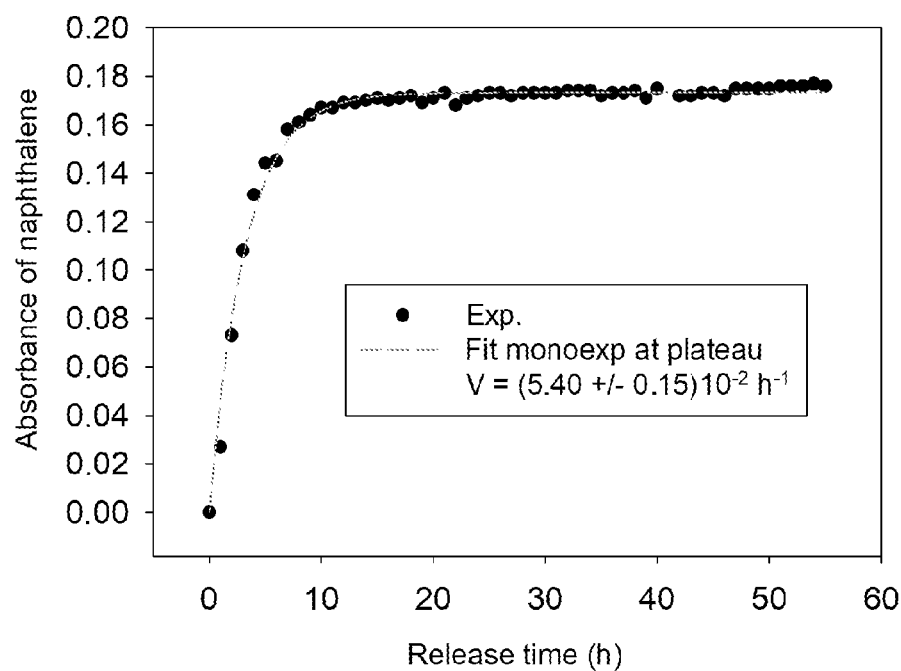
FIG. 10: Release kinetics of naphthalene trapped in the material of example 7, in static mode.
Figure 11:
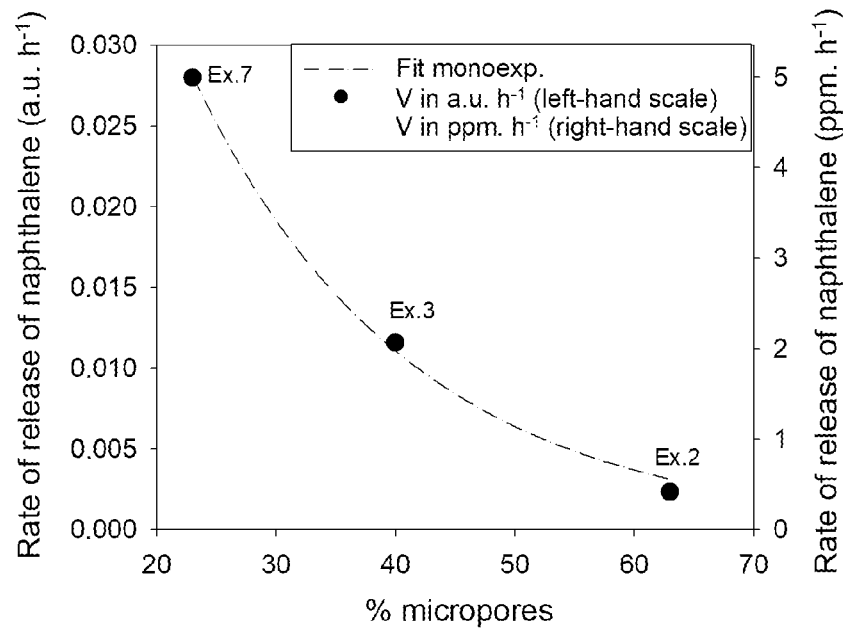
FIG. 11: Correlation between the toluene release rate and the percentage microporosity of the materials of examples 2, 3 and 7.

This test also shows that for a given material, less substantial doping of the naphthalene relative to the toluene is observed for a given duration of exposure to the saturation vapor of each volatile compound. The same is true of the rate of release of naphthalene in static mode (see FIG. 10), which is ~905 times slower than that of toluene with the same material. The rate of release, expressed in $h^{-1}$, was converted into $ppm \cdot h^{-1}$ by taking the molar extinction coefficient of naphthalene at 210 nm (135 800 $mol \cdot^{-1} \cdot L \cdot cm^{-1}$) which is given in the G. A. George et al. reference (G. A. George, G. C. Morris, The intensity of absorption of naphthalene from 30000 to 53000 $cm^{-1}$, J. Mol. Spectros., 26, 67-71, (1968)). As for toluene, the rate of release of naphthalene can be controlled according to the porosity of the material. An example is shown here with a series of experiments conducted with doping for 2 h of various materials of examples 2, 3 and 7 with the saturation vapor from solid naphthalene, with the release of the latter being monitored in static mode (see FIG. 11). These various materials possess different pore sizes and are characterized by their % of micropores (diameter<20 Å). The % of micropores is obtained by calculating the ratio between the surface area of adsorption by the pores with a size of less than or equal to 20 Å (micropores) and the total surface area of adsorption of the material (see table 1). The left-hand scale corresponds to an arbitrary unit·$h^{-1}$, the right-hand scale to the conversion into $ppm \cdot h^{-1}$. The conditions of the tests were as follows: volume of the release system=170 mL, T=293 K, optical path length of the spectrophotometer cell=1 cm, molar extinction coefficient of naphthalene at 210 nm=135 800 $mol^{-1} \cdot L \cdot cm^{-1}$. Each dot corresponds to the release rate determined as described above relative to the measurements presented in FIG. 7B.

Release in Dynamic Mode

Figure 12:
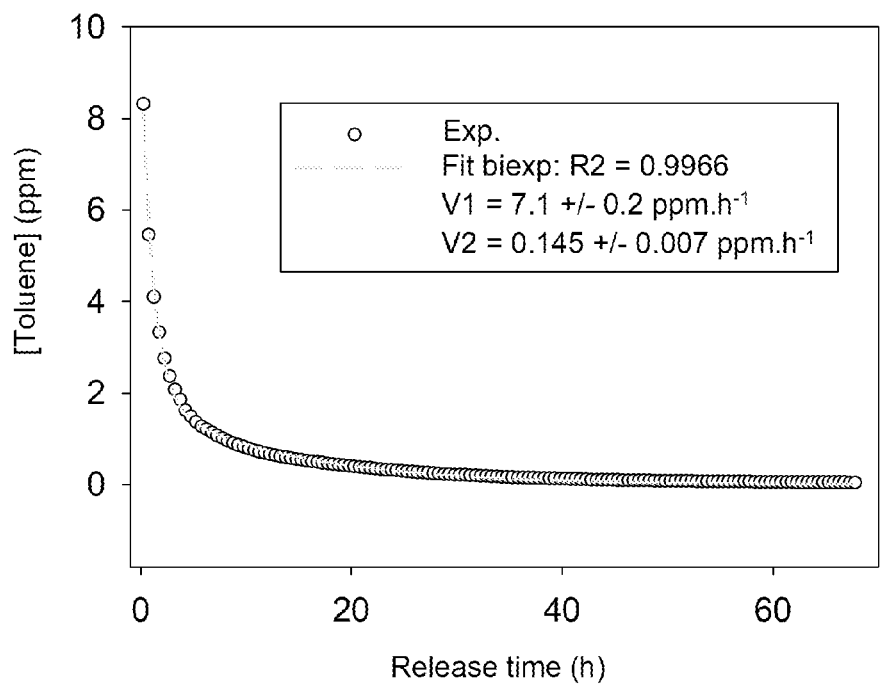
FIG. 12: Release kinetics in dynamic mode of toluene with the material of example 4 doped for 2 h with the saturation vapor of toluene.

For the dynamic mode release tests, the material of example 4 doped for 2 h with the saturation vapor of toluene is placed in a FLEC (Field Laboratory Emission Cell) emission test cell having an internal diameter of 15 cm and a volume of 35 mL. The standardized measurement method (Standard ISO 16000-10, 2006) is based on dynamic sweeping of the surface of the doped material with a stream of wet air (RH 50±3%) and a sweep velocity of the air over the surface of the material of between 0.003 to 0.3 $m \cdot s^{-1}$. In order to have a temperature of 23° C. (±1), the assembly is installed in a conditioning chamber. For measuring the amount of pollutant released, the outlet of the FLEC cell is connected to an automatic gas chromatography (GC) analyzer which is equipped with a flame ionization detector (FID). This analyzer is able to measure VOCs having between 6 and 12 carbon atoms by carrying out separation and direct analysis of the pollutants leaving the FLEC. The rate of release is then obtained via direct measurement of the concentration of pollutant released by the doped material as a function of time. FIG. 12 shows the kinetics of release of toluene as a function of time (circular dots) and the correlation of the measurement with kinetics of biexponential decay ([toluene]= a exp(−bt))+c exp(−dt)), with V1=a*b and V2=c*d.

The invention claimed is:

1. A process for preparing monolithic nanoporous silicate sol-gel material, said process comprising the following steps:

a) synthesizing a gel from at least one organosilyl precursor, the synthesis being carried out in aqueous medium optionally comprising an organic solvent and without structuring agent, b) drying the gel obtained in step a) at a temperature of between 10° C. and 70° C., in a stream of gas in a drying chamber until a monolithic nanoporous silicate sol-gel material is obtained and the residual relative humidity in the drying chamber is between 0.1% and 20%.

2. The process as claimed in claim 1, wherein the drying step b) is carried out at a temperature of between 15° C. and 55° C.

3. The process as claimed in claim 1, wherein the drying step b) is carried out at a temperature of between 20° C. and 40° C.

4. The process as claimed in claim 1, wherein the residual relative humidity in the drying chamber in step b) is between 0.5% and 10%.

5. The process as claimed in claim 1, wherein the residual relative humidity in the drying chamber in step b) is about 5%.

6. The process as claimed in claim 1, wherein the synthesis is carried out without acidic or basic catalyst.

7. The process as claimed in claim 1, wherein the at least one organosilyl precursor is selected from tetramethoxysilane, tetraethoxysilane, phenyltrimethoxysilane, phenyltriethoxysilane, a fluoroalkyltrimethoxysilane, a fluoroalkyltriethoxysilane, a chloroalkyltrimethoxysilane, a chloroalkyltriethoxysilane, an alkyltrimethoxysilane, an alkyltriethoxysilane, an aminopropyltriethoxysilane, an aminopropyltrimethoxysilane and mixtures thereof.

8. The process as claimed in claim 1, wherein the organic solvent is a $C_1$ to $C_6$ aliphatic alcohol.

9. The process as claimed in claim 1, wherein the organic solvent is methanol or ethanol.

10. The process as claimed in claim 1, wherein the organic solvent is methanol.

11. The process as claimed in claim 1, wherein the drying step is carried out in a stream of dry gas.

12. The process as claimed in claim 1, wherein the drying step comprises applying a stream of wet gas, said wet gas having a relative humidity of 30% to 80%.

13. The process as claimed in claim 6, wherein the drying step is carried out in stages, each stage comprising decreasing the relative humidity in the chamber to a predefined level of relative humidity.

14. The process as claimed in claim 1, wherein the drying step is carried out at a temperature of between 15° C. and 25° C.

15. The process as claimed in claim 1, wherein the drying step is carried out at a temperature of about 20° C.

16. The process as claimed in claim 1, wherein the drying step is carried out at a temperature of between 30° C. and 50° C.

17. The process as claimed in claim 1, wherein the drying step is carried out at a temperature of about 40° C.

* * * * *